United States Patent [19]
Takahashi

[11] Patent Number: 5,631,894
[45] Date of Patent: May 20, 1997

[54] DRIVE UNIT WITH AXIALLY MOVABLE TURNTABLE FOR RECEIVING AN OPTICAL DISK

[75] Inventor: Hiroshi Takahashi, Taikoo Shing, Hong Kong

[73] Assignee: Fillony Limited- a company of Hong-Kong, Wan Chai, Hong Kong

[21] Appl. No.: 566,428

[22] Filed: Nov. 30, 1995

[30] Foreign Application Priority Data

Dec. 19, 1994 [FR] France .................................. 94 15260

[51] Int. Cl.⁶ .................................................. G11B 17/028
[52] U.S. Cl. ........................ 369/270; 360/99.12; 369/75.2
[58] Field of Search ................................. 369/75.2, 270, 369/271; 360/99.12, 99.05

[56] References Cited

U.S. PATENT DOCUMENTS

| | | | |
|---|---|---|---|
| 5,014,143 | 5/1991 | Mori et al. | 360/99.12 |
| 5,166,920 | 11/1992 | Kogure | 360/99.12 |
| 5,275,424 | 1/1994 | Watanabe | 279/2.03 |
| 5,313,351 | 5/1994 | Lee | 360/99.07 |

FOREIGN PATENT DOCUMENTS

| | | | |
|---|---|---|---|
| 517614 | 1/1955 | Belgium | 369/271 |
| 2460024 | 1/1981 | France . | |
| 3534529 | 4/1986 | Germany . | |
| 60-50741 | 3/1985 | Japan | 369/270 |
| 62-34353 | 2/1987 | Japan | 369/270 |
| 2085634 | 4/1982 | United Kingdom | 369/271 |

*Primary Examiner*—Stuart S. Levy
*Assistant Examiner*—Kevin M. Watkins
*Attorney, Agent, or Firm*—Spencer & Frank

[57] ABSTRACT

Rotation of the actuating shaft (4) of the turntable (6) of a compact disk drive unit likewise permits displacement of the turntable between a lowered inoperative position in which it permits movement of the loading drawer (30) supporting the disk (31), and a raised reading position, and securement of the disk on the turntable, without shock or vibration. For this purpose, the turntable co-operates by means of a screwing action with a hollow part (5) integral with the shaft (4). While the turntable raises the disk and removes it from the drawer, a washer (24) mounted on the shaft (4) pushes back towards the exterior an arm (15) mounted to pivot on the turntable, and which firmly clamps the disk on the platform (9) of the turntable. A clutch member (24) integral with the shaft defines the end of travel of the turntable and permits progressive actuation of rotation of the latter.

9 Claims, 3 Drawing Sheets

DRIVE UNIT WITH AXIALLY MOVABLE TURNTABLE FOR RECEIVING AN OPTICAL DISK

BACKGROUND OF THE INVENTION

The invention relates to a device unit for positioning and causing rotation of a disk provided with a central hole for purposes of reading and/or writing of information on said disk, and particularly to a drive unit for use with an optical disk of the type known by the title "Compact Disc".

There exist manually-loaded readers, in which the user places the disk directly on a turntable intended to rotate it for reading, and drawer-loading readers, in which the user places the disk on a horizontal support belonging to a drawer which may for this purpose move out of the reader by means of a horizontal movement, the turntable taking over the disk and removing it from this support by means of a pivotal movement about a horizontal axis, after closure of the drawer.

In both categories of readers, means comprising a magnet are provided in order to connect the disk with the turntable. Moreover, reading of information is effected by a reading head which is displaced substantially radially with respect to one face of the disk. As the distance between the reading head and the surface of the disk must be precisely defined, the head is mounted on a guide structure which is itself integral with the turntable and which, in the case of a drawer reader, accompanies it in its pivotal movement.

It is theoretically possible to use the same head for uninterrupted and alternating reading of disks placed on different turntables, each disk placed on a turntable being replaced after reading and during reading of a disk placed on another turntable. However, manual positioning of the disk in the case of a manually-loaded reader, and its securement by magnetic means, for both types of readers, cause shock and vibration which could then be transmitted to the reading head and disturb the ongoing reading process. In drawer readers, the pivotal movement of the head with the turntable likewise prevents it from functioning during changeover of the disk.

Moreover, the pivotal movement of the turntable, in the case of a drawer reader, and the magnetic fixing of the disk, use a motor separate from the one used for causing rotation of the turntable during reading; this complicates the structure of the arrangement and increases its bulk and its expense.

SUMMARY OF THE INVENTION

The purpose of the invention is to remedy all or part of the above named disadvantages.

The invention aims particularly at a disk drive unit of the type described in the introduction, comprising a support for receiving the disk when it is introduced into the unit, a turntable, adapted to rotate about an axis at a speed corresponding to the rotational speed of the disk required for reading/writing, the turntable having a seat platform for accommodating one region of a first face of the disk adjacent to said central hole, a transfer arrangement adapted to displace the turntable when said first face of the disk rests on the support, from an inoperative position in which said seat is remote from said region, to an operative position in which said seat is in contact with said region and keeps the disk remote from the support, and a clamping arrangement firmly securing the disk to the turntable in the operative position, and disengaging it therefrom in the inoperative position.

The invention provides that the transfer arrangement comprises an actuating shaft and a clutch member which is adapted to move axially with respect to the turntable in correspondence with the axial displacement proper of the latter, and that the clamping arrangement comprises at least one clamping element, the clamping arrangement co-operating with the transfer arrangement and with the turntable so that the (or each) clamping element carries out, under the effect of the relative displacement of the clutch member, with respect to the turntable, a movement comprising a radial component so as to contact the disk, in the vicinity of the central hole, in order to clamp it firmly on to the seat when the turntable moves towards its operative position.

During the axial displacement of the turntable, the (or each) clamping element of the clamping arrangement ensures progressive securement of the disk on the turntable, avoiding all shock and vibration.

Other features of the invention, which are complementary or alternative, are set forth in the following:

- The (or each) clamping element passes through the central hole during the axial movement of the turntable, and then moves away from the axis in order to project relative to the second face of the disk in the operative position.
- The (or each) clamping element is mounted to pivot on the turntable about an axis in a plane perpendicular to the axis of said turntable.
- The relative movement of the turntable and of the clutch member is brought about by rotation of the actuating shaft. Positioning and securement of the disk then use the same motor as that used for rotating it during reading, thus simplifying the drive unit and reducing its bulk and expense.
- The clutch member is fixed in the axial direction.
- The clutch member is integral with the actuating shaft and adapted to cooperate with the turntable in order progressively to transmit to the latter, when it arrives in its operative position, the rotational movement of the shaft.
- Rotation of the turntable is immobilised by friction with an arrangement which keeps the turntable from rotating when it is remote from its operative position, the frictional couple with the clutch unit becoming greater than that with the rotation prevention arrangement upon the approach to the operative position.
- The transfer arrangement also comprises a movement-conversion unit, likewise integral with the shaft, the movement-conversion unit and the turntable having mutually co-operative surfaces in order to transform the rotational movement of the movement-conversion unit into an axial translatory movement of the turntable.
- The mutually-co-operating surfaces belong to an internal thread of the movement-conversion unit, and to an external thread of the turntable.
- The transfer arrangement also comprises a stop means, which rotates freely with respect to the shaft, for its cooperation with the (or each) clamping element.

The invention also has as its subject an apparatus for reading and/or writing of information on disks, comprising at least one drive unit as defined above, and an optical reading and/or writing unit mounted on a fixed guide structure so as to move substantially radially with respect to one face of a disk when the latter is caused to rotate by the drive unit. Thus the reading/writing unit and its guide structure do not accompany the turntable in its axial movement, thus further simplifying the device and improving its operational reliability.

Such an apparatus may comprise at least two disk drive units, the optical reading and/or writing unit being mounted on the said structure so as to be able to move with respect to one face both of a disk caused to rotate by one of the drive unit, and of a disk caused to rotate by the other device. Thus a single reading/writing unit is used for a plurality of turntables, involving extra simplification and economy. Moreover, the disk placed on one of the turntables may, after reading or writing, be replaced by another disk, without disturbing the ongoing reading/writing on another turntable, due to the absence of shock and vibration, enabling practically continuous reading/writing, interrupted only during the period of displacement of the optical unit from one disk to another.

BRIEF DESCRIPTION OF THE DRAWINGS

The features and advantages of the invention will be illustrated in more detail in the following description, with reference to the annexed drawings, wherein.

DESCRIPTION OF THE PREFERRED EMBODIMENTS

Figure 2:
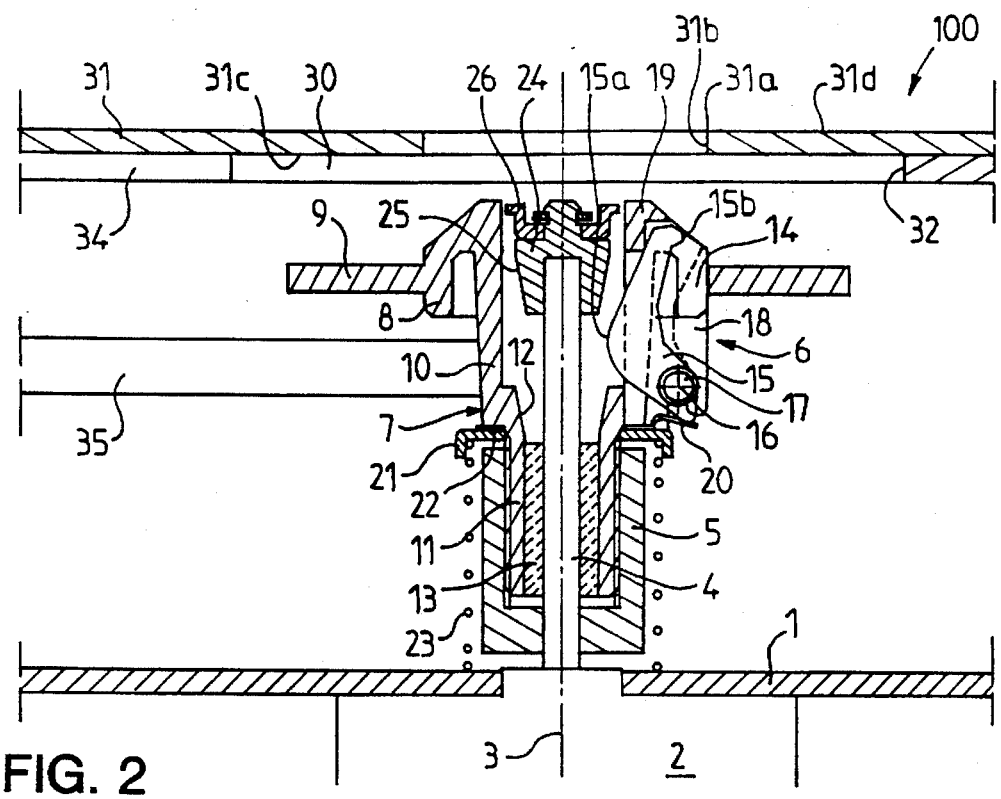
FIGS. 2 and 3 are partial cross-sectional views along line II—II of FIG. 1, the turntable being respectively in its inoperative and its operative positions.
Figure 3:
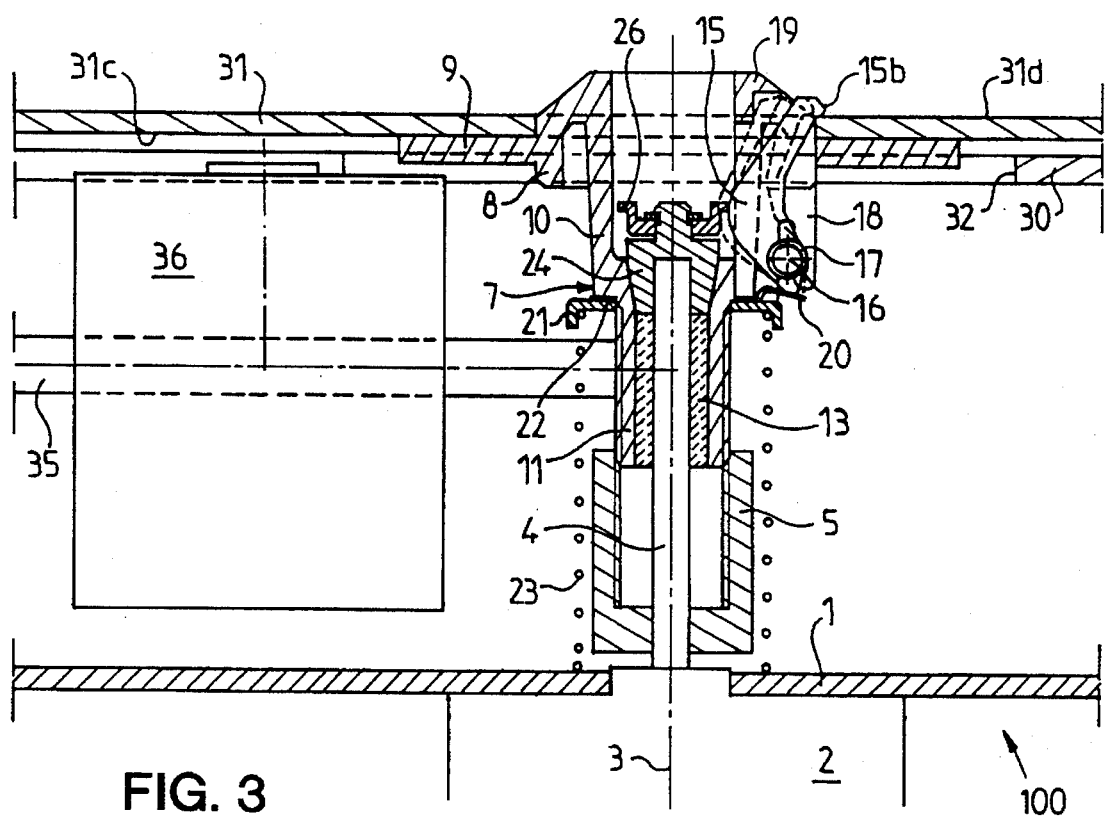

A disk drive unit 100 is partially illustrated in FIGS. 2–3. The disk drive unit 100 comprises a framework equipped with a horizontal mechanism plate 1 on the lower face of which is fixed the casing of a motor 2 with a vertical axis 3, the output shaft 4 of the motor projecting above the mechanism plate 1. The shaft 4 passes through the base of a movement conversion part 5 having a bowl shape, open at the top, whose cylindrical wall has an internal thread, the base of the bowl being mounted on the shaft so as to be integral therewith during rotation. The internal thread of the part 5 co-operates with an external thread of a turntable 6 of a general shape revolution about axis 3.

The turntable 6 comprises a tubular shaft 7, the upper end of which is connected to an annular skirt 8 surrounding the upper region of the shaft 7, a horizontal platform 9 of turntable 6 extending radially towards the exterior from the skirt 8. The shaft 7 is made up of an upper portion 10 with greater internal and external diameters, extending downwards from its upper end to a point beyond the lower end of the skirt 8, and a lower portion 11 with smaller diameters, carrying the abovementioned external thread. The portions 10 and 11 are mutually externally connected at a horizontal shoulder 22, and internally at a frustoconical surface 12. A bushing 13 made of material with a low coefficient of friction, slipped into the portion 11, is adjusted to provide slight friction on the shaft 4 so as to permit precise rotation with a low degree of friction of the turntable about the axis 3. A radial slot 14 is provided in the upper portion 10 of the shaft 7 and in the skirt 8, so as to accommodate a clamping arm 15 mounted to pivot with respect to the turntable about a horizontal axis 16 oriented tangentially with respect to the turntable. The arm 15 is mounted for this purpose on a journal 17, both ends of which are respectively fixed on the two branches of a fork forming part of the turntable, one branch 18 being visible in FIGS. 2 and 3, these two branches extending radially towards the exterior from the portion 10 of the shaft and downwards from the skirt 8, and being circumferentially disposed on either side of the slot 14. The arm 15 is substantially boomerang-shaped. It extends upwards from the axis 16 and firstly is oriented obliquely towards the axis 3, then curves inwards in a central region 15a, forming a projecting convex rounded portion on the interior of portion 10, then adopting an oblique orientation towards the exterior. The slot 14 is interrupted at the level of the upper end of the shaft 7 to form a strap of material 19 which serves as a stop means for the upper portion of the arm 15, and limits is pivotal movement in the direction of the axis 3, said movement being facilitated on the one hand by the force of gravity, the centre of gravity of the arm being placed higher and closer to the axis 3 than axis 16, and by a blade spring 20 mounted on the shaft 7 and acting on the lower end of the arm.

A ring 21 surrounds the lower portion 11 of the shaft and is applied against the shoulder 22 by a helical spring 23 which is compressed axially between said ring and the mechanism plate 1 of the framework. A clutch member or friction piece 24 fixed to the upper end of the shaft 4 has an external frustoconical surface 25 configured for engagement with the internal frustoconical surface 12 of the shaft 7. A stop member such as washer 26 is mounted so as to be captive but freely rotatable on the piece 24.

Figure 1:
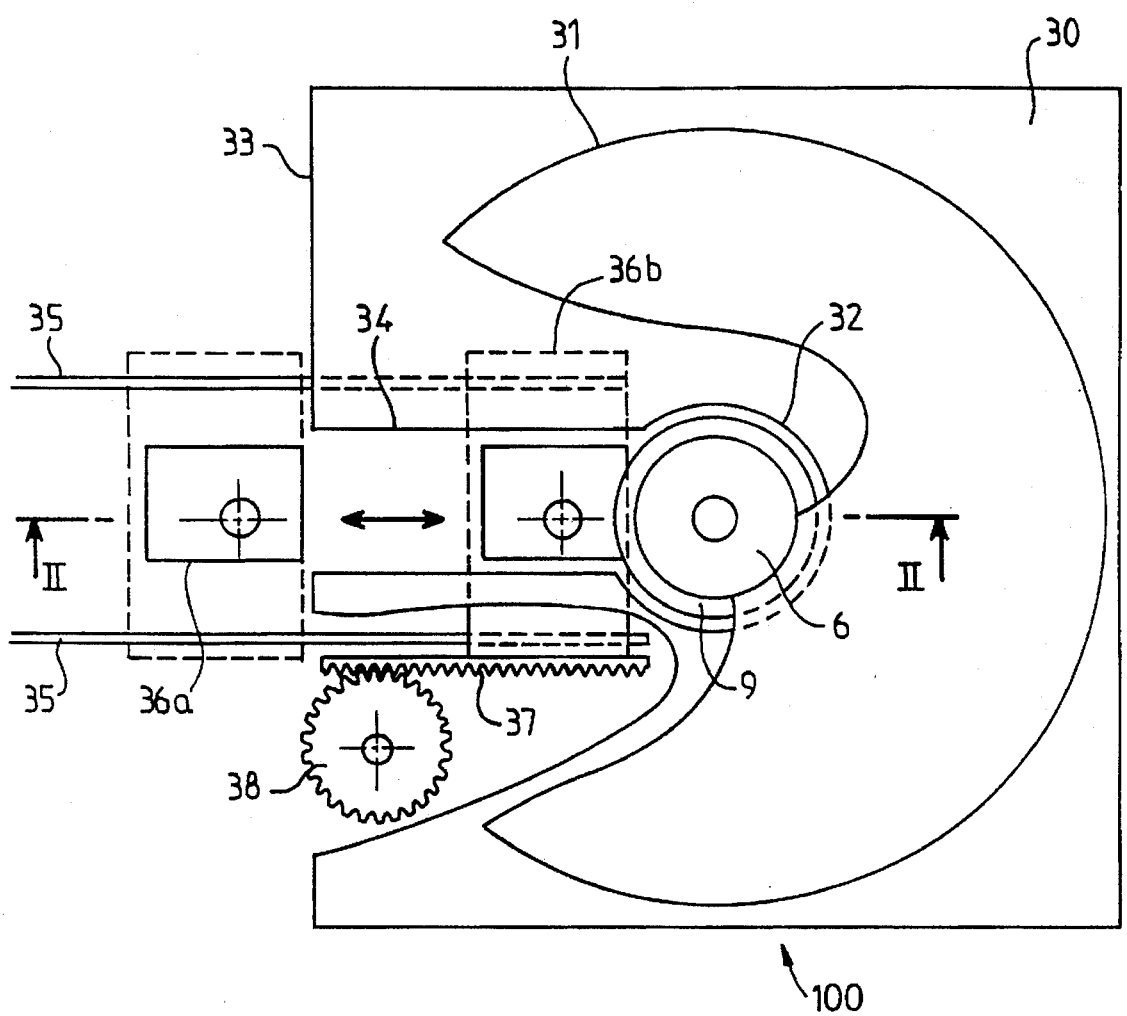
FIG. 1 is a partial view from above, partially cut away, of a compact disk reader apparatus fitted with a drive unit according to the invention.

In a known way, the disk drive unit reader also comprises a receiver platform 30 upon which there may be manually placed a disk 31 for reading, the disk 31 being positioned, for example by centering means provided on the platform 30, so that its axis coincides with the axis 3. The platform 30 for example forms part of a drawer which may extend from the casing of the reader by means of a translatory axial movement for placing or manual extraction of the disk, and move back into the casing, complete with disk, in order to occupy the position illustrated. The platform 30 has a central opening 32 whose diameter is greater than that of the platform 9 of the turntable, and which is connected to a free edge 33 (see FIG. 1) of the platform 30 by a radial notch 34 with parallel edges. The disk drive unit is part of a reader apparatus which includes two rails 35 fixed to the framework, oriented horizontally and parallel to the edges of the notch 34. The rails 35 as supports and guides for an optical unit 36 (see FIG. 3) effecting the reading proper of the disk. Thus the unit 36 may move horizontally so that the source of the incident luminous beam and the receiver for the beam reflected by the disk are opposite the lower face of the disk and travel along a radius of the latter. This movement is obtained by means of a rack 37 integral with the unit 36, co-operating with a pinion 38 which is caused to rotate.

The arrangement according to the invention operates in the following manner.

At the moment of positioning of the disk 31 on the platform 30, the turntable is in its lowered inoperative position shown in FIG. 2, the portion 11 of the shaft being screwed into the part 5, approximately as far as the base of the latter. The skirt 8 and the platform 9 of the turntable are already higher than the rails 35, but the turntable is entirely beneath the platform 30 in order not to hinder the latter's movement during opening and closing of the drawer. The unit 36 is remote from the axis 3, as shown at 36a in FIG. 1. The friction piece 24 and the ring 26 are located in the interior of the upper portion 10 of the shaft 7 and above the central region 15a of arm 15.

The motor 2 is started in order to cause shaft 4 to turn in the direction and at the speed corresponding to the direction and rotational speed of the disk required in order to read it. This direction of rotation likewise corresponds to unscrewing of the part 5 when the turntable is not rotating. The frictional force between the ring 21 and the shoulder 22, applied one against the other by the spring 23, is greater than the frictional forces between the part 5 and the portion 11 and between the shaft 4 and the bushing 13. Thus the turntable is kept from rotating and rises, unscrewing with respect to the part 5. The platform 9 of the turntable then passes across the central opening 32 of the support platform 30, coming into contact with the lower face 31c of the disk 31 and raising the latter with respect to the platform 30, the skirt 8 adjusting the hole 31b. At the same time, the free end of arm 15, which is still stopped on the strap 19, passes across the central opening of the disk 31. The end of travel of the turntable is defined when the frustoconical surfaces 12 and 25 of shaft 7 and of part 24 come into mutual contact, as shown in FIG. 3, the threaded portions of the shaft and of the part 5 remaining in engagement over a small portion of their length. Immediately prior to this end of travel, the free edge of the washer 26 comes into contact with the dorsal, inwardly-curved region 15a of arm 15, pushing the latter back towards the exterior and thus bringing it into contact with the upper edge 31a of the central hole 31b of the disk. A projection 15b turned radially towards the exterior, presented by the arm 15 at its free end, is applied against the upper face of the disk. Thus the disk is pressed firmly or clamped on the platform 9 of the turntable, and is rendered integral with the latter. The frustoconical surfaces 12 and 25 carry out the function of a clutch and allow progressive initiation of rotation of the turntable, the latter being effected, in the same way as securement of the disk by the arm 15, without shock or vibration. Reading may then begin by means of the optical unit 36, which is shown in the reading position in FIG. 3, and in FIG. 1 under the reference numeral 36b.

When reading is terminated, the motor 2 is caused to rotate in the direction opposite to the reading direction. As the turntable is again kept from rotating by means of friction on the ring 21, it is screwed into the part 5. The movements opposite to those formerly described are then effected, the washer 26 freeing the arm 15 which in turn frees the disk 31 and passes across the hole 31b in order to return under the disk, the latter then being again placed on the platform 30. The reverse rotation of the motor is continued until the turntable has reverted to the inoperative position shown in FIG. 2. The drawer may then be pulled out in order to extract the disk from the platform 30.

Naturally, the turntable may comprise a plurality of pivoting arms 15, for example two, three or four, uniformly distributed about the axis 3.

Figure 4:
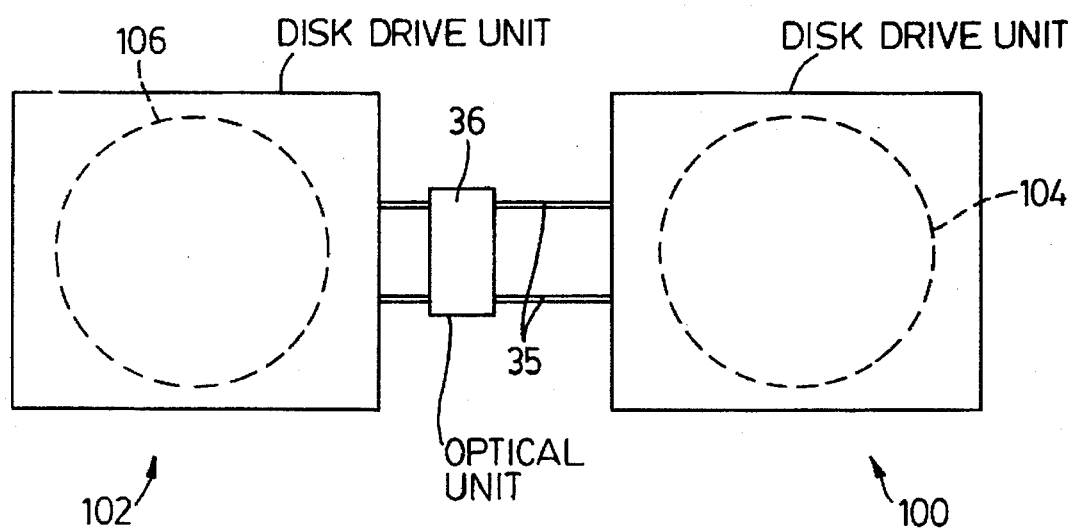
FIG. 4 is a top view schematically illustrating a compact disk reader apparatus which has aa plurality of drive units according to the invention.

As indicated above, the absence of shock and vibration during initiation of rotation of the turntable and securement of the disk on the latter allows the use of two drive units according to the invention, or even more, in a multiple reader apparatus using the same optical unit for reading, positioning of a disk on a turntable being capable of being effected during reading of another disk. For example, in FIG. 4 a second disk drive unit 102 in accordance with the invention is arrangement provided, to the left of the arrangement disk drive unit 100, the optical unit 36 being capable of moving linearly between the axis 3 of disk drive unit 100 (not shown in FIG. 4) and the axis of the second disk drive unit 102 (not shown) so as to sweep over, during one portion of its trajectory, the radius of a disk 104 placed on the turntable of the first drive unit 100, and, during another portion of its trajectory, the radius, co-linear with the first, of a disk 106 placed on the turntable of the second drive unit 102.

What is claimed is:

1. A drive unit for positioning and rotating a disk having a central hole for purposes selected from reading and writing of information on said disk, comprising:
    a support for receiving the disk when the disk is introduced into the drive unit;
    a turntable having an axis, the turntable being rotatable about its axis and having a platform for accommodating one region of a first face of the disk adjacent to said central hole;
    transfer means for displacing the turntable from an inoperative position in which the platform is remote from said region of the disk when the first face of the disk rests on the support, to an operative position in which the platform is in contact with said region of the disk and keeps the disk remote from the support, the transfer means displacing the turntable in the axial direction of the turntable and including
    a rotatably mounted actuation shaft,
    a clutch member, fixed with respect to the axial direction of the turntable and integral with the actuation shaft, for cooperating with the turntable to progressively transmit the rotational movement of the actuation shaft to the turntable when the turntable arrives in its operative position, the turntable being axially movable with respect to the clutch member during the axial displacement of the turntable, and
    means for keeping the turntable from rotating by friction when the turntable is remote from its operative position, the frictional couple of the turntable with the clutch member becoming greater than the frictional couple with the means for keeping upon the approach of the turntable to its operative position; and
    clamping means for firmly securing the disk to the turntable when the turntable is in its operative position and disengaging the disk from the turntable when the turntable is in it inoperative position, the clamping means cooperating with the transfer means and with the turntable, the clamping means including a clamping element which carries out, under the effect of the relative displacement of the turntable with respect to the clutch member, a movement having a radial component with respect to the turntable so as to contact the disk, in the vicinity of the central hole, in order to clamp it firmly onto the platform when the turntable moves towards its operative position.

2. A drive unit as recited in claim 1, wherein the clamping element passes through the central hole during the axial movement of the turntable, and then moves away from the axis in order to project relative to a second face of the disk when the turntable is in the operative position.

3. A drive unit as recited in claim 1, wherein the clamping element is mounted to pivot on the turntable about an axis in a plane which is perpendicular to the axis of the turntable.

4. A device unit as recited in claim 1, wherein the relative movement of the turntable and of the clutch member is brought about by rotation of the actuating shaft.

5. A drive unit as recited in claim 1, wherein the transfer means further includes a movement-conversion unit, integral with the actuation shaft, the movement-conversion unit and the turntable having mutually cooperative surfaces in order to transform rotational movement of the movement-conversion unit into an axial translatory movement of the turntable.

6. A drive unit as recited in claim 5, wherein the mutually-co-operating surfaces comprise an internal thread of the movement-conversion unit, and an external thread of the turntable.

7. A drive unit as recited in claim 1, wherein the transfer means further comprises a stop means, which rotates freely with respect to the shaft, for co-operation with the clamping element.

8. A drive unit according to claim 1, in combination with a fixed guide structure and an optical unit carried by the guide structure so as to move substantially radially with respect to the first face of the disk when the disk is caused to rotate by the drive unit, the disk being an optical disk.

9. A drive unit according to claim 1, said drive unit being a first drive unit and said disk being a first optical disk, in combination with a second drive unit according to claim 1 for positioning and rotating a second optical disk, a fixed guide structure between the drive units, and an optical unit carried buy the guide structure so as to move substantially radially adjacent the first optical disk when the first optical disk is caused to rotate by the first drive unit and so as to move substantially radially adjacent the second optical disk when the second optical disk is caused to rotate by the second drive unit.

* * * * *